April 3, 1951  P. H. MULLINS  2,547,655
CASTING ROD HANDLE
Filed April 30, 1948
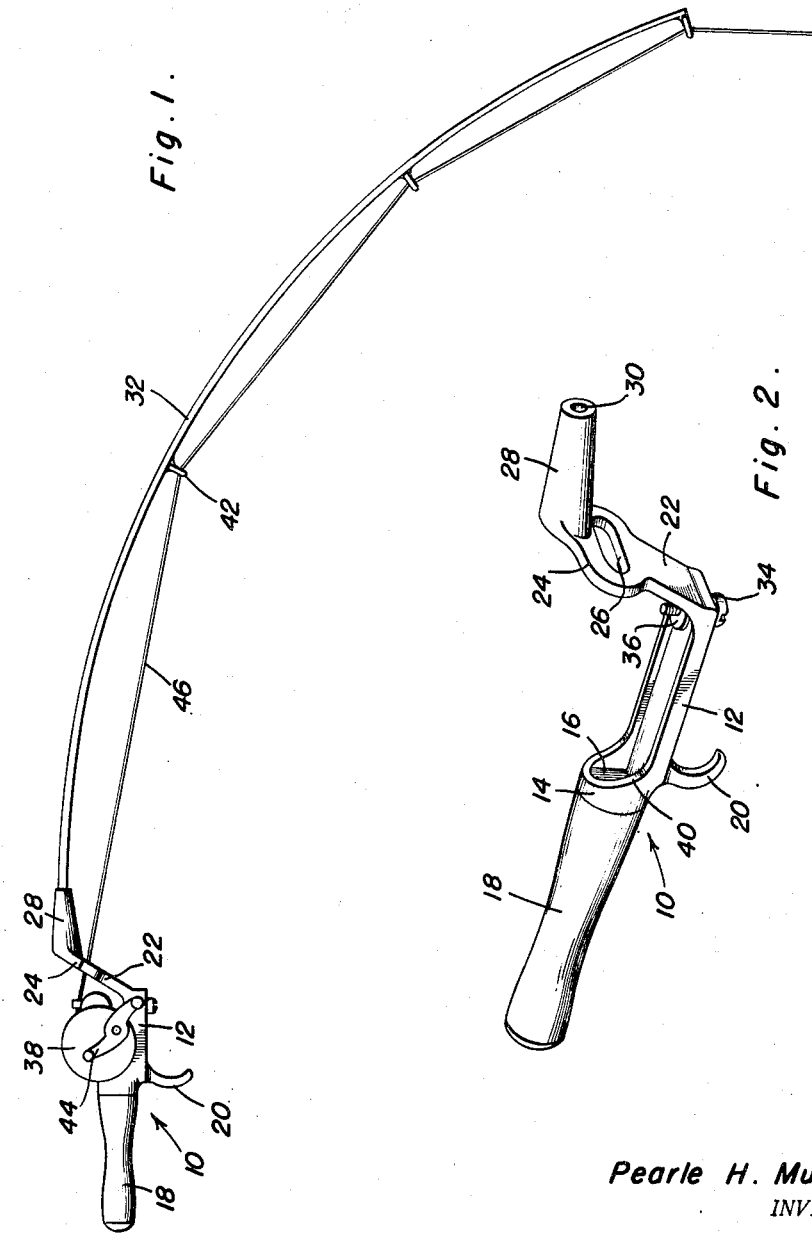
Pearle H. Mullins
INVENTOR.
BY *[signatures]*
Attorneys Patented Apr. 3, 1951

2,547,655

UNITED STATES PATENT OFFICE 2,547,655

CASTING ROD HANDLE

Pearle H. Mullins, Canton, Ohio

Application April 30, 1948, Serial No. 24,262

2 Claims. (Cl. 43—23)

This invention relates to new and useful improvements in fishing devices and the primary object of the present invention is to provide a novel and improved handle construction for fishing poles embodying a frame and means for holding a fishing reel relative to the frame in a conveniently accessible position.

Another important object of the present invention is to provide a casting rod handle including a reel supporting frame and a novel and improved guide member for receiving a line in such a manner as to eliminate unnecessary friction and wear on the line due to dragging and backlashing of the said line during the winding or unwinding of the fishing reel.

A further object of the present invention is to provide a casting rod handle including a novel and improved grip which is conveniently grasped by a user and which includes a finger receiving trigger rigidly secured to the handle to facilitate the convenient manipulation of a fishing rod for casting or the like.

A still further aim of the present invention is to provide a casting rod handle that is extremely small and compact in structure, strong and reliable in use, simple and practical in construction, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which;

Figure 1 is a side elevational view showing the present casting rod handle in use; and Figure 2 is a perspective view of the casting rod handle constructed in accordance with the present invention.

Referring now to the drawings in detail, wherein for the purpose of illustration, there is disclosed a preferred embodiment of the present invention, the numeral 10 represents the present casting rod handle generally, including a substantially channel-shaped frame 12 the rear end of which is integrally formed with an upstanding socket or ring 14 that fixedly engages the reduced forward terminal 16 of a rearwardly extending hand grid 18. It is noted, that the longitudinal axis of the hand grid 18 is spaced above and parallel to the longitudinal axis of the frame 12 for a purpose which will later be more fully apparent.

Integrally formed with the web portion of the frame 12, adjacent the socket 14, is a downwardly projecting arcuate finger engaging member 20 which is disposed in an easily accessible position relative to the hand grip 18.

Rigidly attached to or forming an integral part of the forward terminal of the frame 12 is an upwardly and forwardly inclined guide plate 22 having an enlarged upper terminal or head portion 24 which is formed with a transversely disposed guide slot or opening 26 that is spaced above the upper periphery of the hand grid 18 and whose longitudinal axis is disposed in a plane spaced from, and parallel to, the longitudinal axis of the frame grip 18.

Integrally formed with the forward face of the guide plate 22, and above the guide slot 26, is the major end portion of a substantially frusto-conical rod receiving socket 28 having an axial bore 30 for engaging one end of a suitable fishing pole or flexible rod 32.

Adjustably carried by the web portion of the channel frame 12, is a fastener 34 supporting a clamping plate 36 which will engage one end of the elongated, concavo convexed attaching arm (not shown) of a suitable fishing reel 38 which is disposed on the web portion of the channel frame 12. The forward edge of the ring or socket 14 is arcuately formed as at 40 so that the sides of the fishing reel 38 may bear against the same without movement when it is applied to the frame 12.

In practical use of the present invention, when the fishing reel 38 is applied to the frame it is noted that the entire handle will be properly balanced due to the positioning of the hand grip 18 relative to the frame 12, the finger grip 20 carried by the frame, and the socket 28 integrally formed with the guide plate 22, whereby the said casting rod handle may be conveniently manipulated by a fisherman to cast a line 46 which extends from the reel 38, through the guide opening 26 and thence through the guide rings 42 depending from the lower periphery of the rod 32.

When the said line 46 is pulled outwardly through the guide opening 26, it will not contact the fishing rod 32 nor will the same engage the frame or hand grip which would cause a wearing and breakage of the line.

Guide opening 26 is so arranged and proportioned with respect to the width of the reel 38 that it will accommodate the line being unwound or wound upon the reel 38 at all times without the said line frictionally engaging the sides of the guide opening.

The enlarged head portion 24 of the guide plate 22 is so positioned that when the actuating lever 44 of the fishing reel 38 is rotated the said lever will not engage or contact the head portion to prevent normal winding or unwinding of the reel.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A casting rod handle comprising an elongated channel-shaped frame having forward and rear ends, a socket at the rear end of said frame, a hand grip having one end fixed in said socket, a finger grip depending from said frame, fastening means carried by the frame for retaining a reel in said frame, a forwardly and upwardly inclined guide plate integrally formed with the forward end of said frame, said guide plate having an enlarged upper end portion, the upper end portion of said guide plate having an elongated substantially horizontal guide slot therein disposed transversely of and parallel to said frame, and a frusto-conical, rod-receiving, socket member having its major end fixed to said guide plate, said socket member being disposed above said guide slot, said slot being of a length considerably greater than the width of said frame.

2. A casting rod handle comprising an elongated channel-shaped frame having forward and rear ends, a socket at the rear end of said frame, a hand grip having one end fixed in said socket, a finger grip depending from said frame, fastening means carried by the frame for retaining a reel in said frame, a forwardly and upwardly inclined guide plate integrally formed with the forward end of said frame, said guide plate having an enlarged upper end portion, the upper end portion of said guide plate having an elongated substantially horizontal guide slot therein disposed transversely of and parallel to said frame, and a means carried by said guide plate and disposed above said guide slot for supporting a fishing pole, the longitudinal axis of said guide slot being disposed in a plane parallel to the longitudinal axis of said frame.

PEARLE H. MULLINS.

REFERENCES CITED

The following references are of record in the file of this patent:

UNITED STATES PATENTS

| Number | Name | Date |
| --- | --- | --- |
| 610,604 | Hazelrigg | Sept. 13, 1898 |
| 1,591,122 | Gephart | July 6, 1926 |
| 2,194,639 | Cole | Mar. 26, 1940 |
| 2,334,646 | Price | Nov. 16, 1943 |
| 2,447,720 | Thomas | Aug. 24, 1948 |